Oct. 3, 1939.   V. D. PADERNAL   2,174,525
TREE CLIMBING DEVICE
Filed Sept. 20, 1938   2 Sheets-Sheet 1

Vincente D. Padernal
INVENTOR
BY Victor J. Evans & Co.
ATTORNEY

Oct. 3, 1939.    V. D. PADERNAL    2,174,525
TREE CLIMBING DEVICE
Filed Sept. 20, 1938    2 Sheets-Sheet 2

Vincente D. Padernal
INVENTOR
BY Victor J. Evans & Co.
ATTORNEY

Patented Oct. 3, 1939

2,174,525

UNITED STATES PATENT OFFICE 2,174,525

TREE CLIMBING DEVICE

Vincente D. Padernal, Salinas, Calif.

Application September 20, 1938, Serial No. 230,857

1 Claim. (Cl. 227—24)

My invention relates to tree climbing devices and more particularly to a power driven type.

One of the principal objects of my invention is to provide a tree climbing device equipped with power driven means for engaging the trunk of the tree whereby to elevate and lower said device.

Another object of my invention is to provide a device of the above described character which is simple in construction, efficient in operation, durable in use and economical in manufacture. A further object of my invention is to provide a device of the character described having means adjustable therein whereby to accommodate trunks of trees of different sizes thereby permitting general use of the device.

Other objects and advantages will be apparent from the following description, appended claim and annexed drawings.

Referring to the drawings wherein like reference characters designate like parts throughout the several views.

Figure 1:
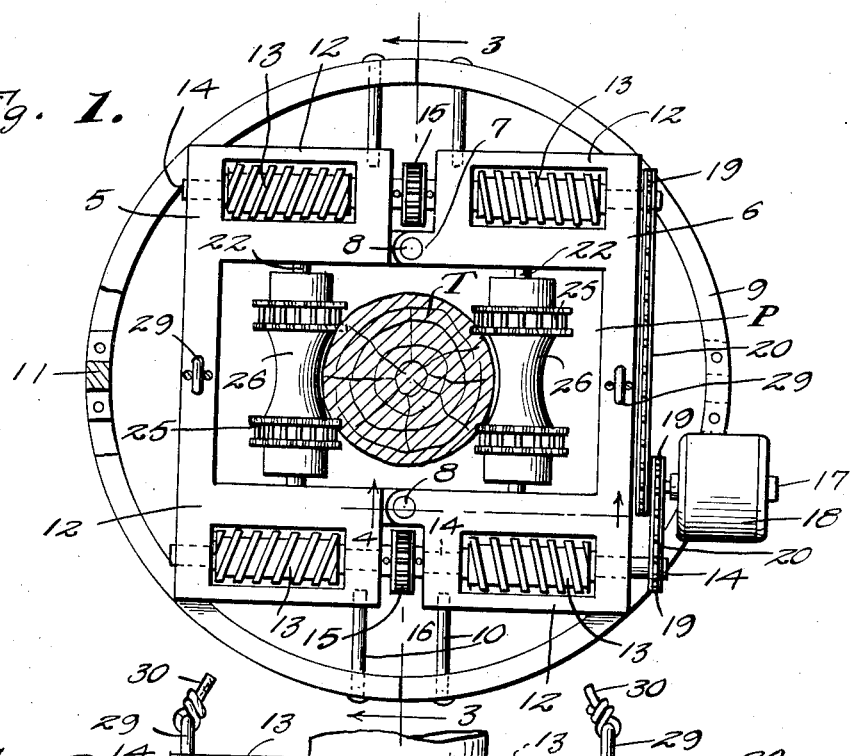
Figure 1 is a top plan view of my invention illustrating the same engaged about the trunk of a tree.
Figure 2:
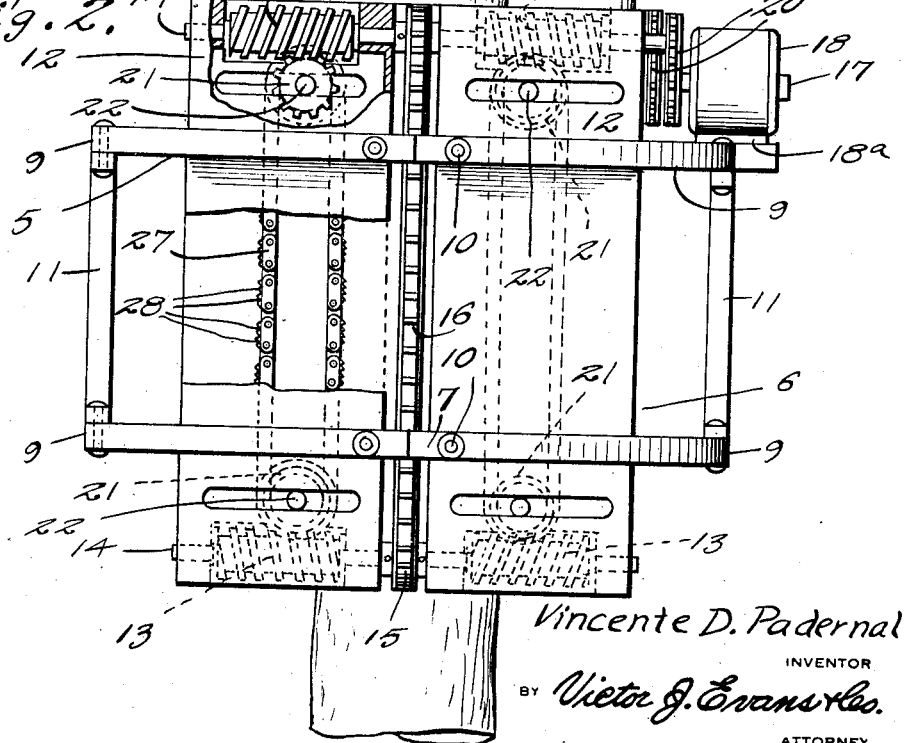
Figure 2 is a front elevation thereof.
Figure 3:
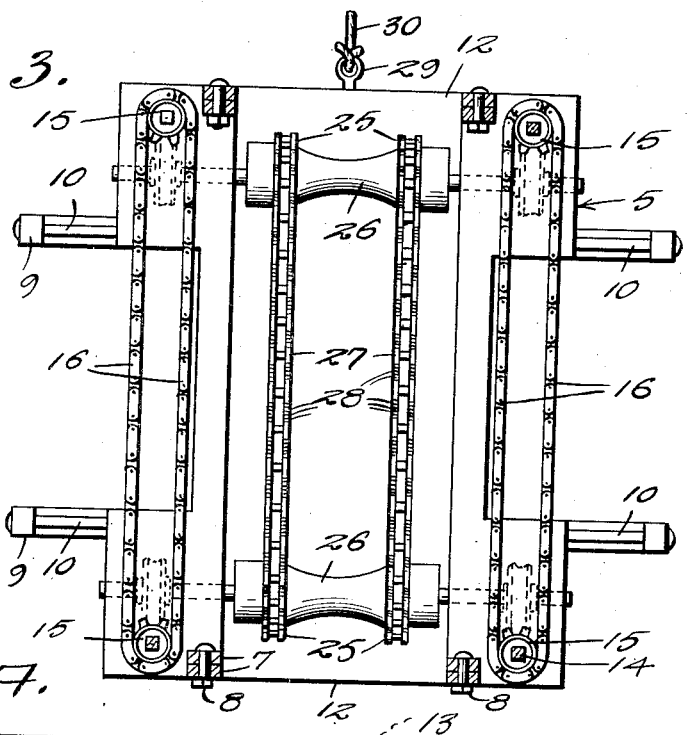
Figure 4:
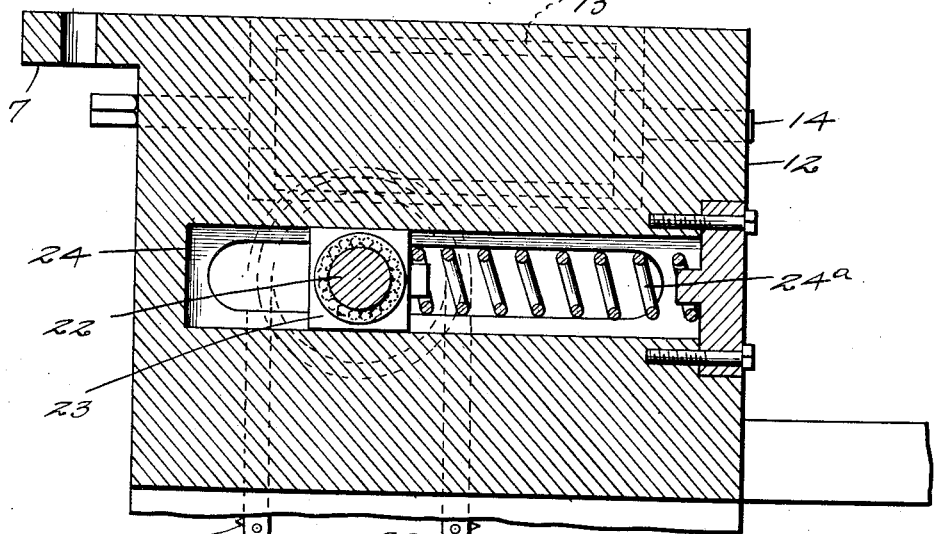

Figures 3 and 4 are sectional views taken on the lines 3—3 and 4—4 of Figure 1 respectively.

Figure 5:
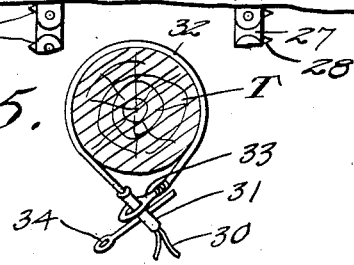

Figure 5 is a detail sectional view through a trunk of a tree illustrating the looped end of the safety cable connected thereto.

In practicing my invention I provide a pair of frame sections 5 and 6 connected together by means of interfitting end portions 7, formed on the opposing faces thereof, having bolts 8 secured therethrough.

The outer corners of each of the sections 5 and 6 have fashioned thereon a pair of spaced arcuate shaped members 9, the ends of the members of one section abutting the ends of the members of the other section to form upper and lower ring shaped platforms encircling said sections. The abutting end portions of said members are secured to the respective sections by means of bolts 10 and the intermediate portion of the respective members are connected to each other by means of braces 11 whereby to reenforce and form a unitary structure capable of being readily detached from a trunk of a tree by removal of the pins 8.

Each of the sections 5 and 6 are fashioned with spaced upper and lower pairs of housings 12, said pairs being spaced relative to each other to form a rectangular shaped passage P through which the trunk of a tree T extends. Located within the housings 12 are worms 13 fixed to upper and lower driven shafts 14 journaled in respective housings, said upper and lower shafts each formed of respective sections operating in respective housings. Said sections are fashioned with abutting squared ends on which are secured sprockets 15 serving to connect the respective sections together and drive the same in unison.

Each of the upper sprockets are connected to a lower sprocket by means of sprocket pins 16. One of the outer ends of each upper shaft is connected to a drive shaft 17 of a reversible electric motor 18 by means of sprockets 19 and pins 20, thereby effecting a connection for driving all of the worms 13.

Mounted within the housings are worm gears 21 meshing with the respective worms 13. Said gears are fixed to transversely extending shafts 22 journaled in bearing blocks 23 slidably mounted within guideways 24 within the respective housings 12. Springs 24a are carried within the guideways and coact with the blocks 23 and the housing walls to urge the shafts 22 in the respective upper and lower housings towards each other, said shafts being rotated by means of the gears 21 meshing with the worms 13.

Fixed on each of the shafts 22 are pairs of sprockets 25 spaced relative to each other by means of elongated concavo-concave shaped spacing sleeves 26. Each of the upper sprockets are connected to respective subjacent sprockets by means of sprocket chains 27. The links of the sprocket chains 27 are formed on the outer faces thereof with teeth 28 for engaging and penetrating the trunk of the tree T, thereby effecting a raising or lowering of the frame relative to the tree upon operation of the motor 18 in a desired direction. The motor 18 is mounted on a plate or base 18a secured to the upper platform adjacent one of the housings 12.

Secured on the upper faces of the sections 5 and 6 are eye bolts 29 having attached thereto ends of a cable 30 terminating in joined end sections connected within a sleeve 31. Secured to said sleeve is one end of a loopable cable 32, the opposite end fashioned with a loop 33 through which the cable 32 is trained. The cable 32 is adapted to be looped about the tree T and maintained in adjusted position thereabout by means of a pin 34 passed through the sleeve 21 whereby to effect a safety means for retaining the frame in elevated position when the motor 18 is idle.

From the foregoing it will be apparent that the sections 5 and 6 may be secured about the trunk of a tree and maintained thereabout through the medium of the pins or bolts 8. When thus secured about the trunk of a tree the springs 24a within the housings 12 urge the shafts 22 towards the trunk and consequent engagement of the teeth 28 of the chains 27 into engagement with the trunk. In this position of the parts, the motor is operated in a direction to drive the connected parts for elevating the frame upon the trunk of the tree.

What I claim is:

A device of the character described, comprising, a sectional frame adapted for attachment about the trunk of a tree and formed with housings, gear assemblies operable within said housings including shafts extending from said housings, spaced sprockets fixed on said shafts, chains having links formed with tree penetrating teeth and connected to said sprockets and operable thereby to effect a raising and lowering of said frame about the tree, means connecting said gear assemblies with a source of power for operating the latter and said chains, springs within said housings for normally urging said shafts and said chains in a direction towards each other whereby to maintain said chains in engagement with the trunk of said tree at all times, and a cable connected to said frame and adapted to be looped about said tree whereby to maintain said frame in elevated position when said source of power is idle.

VICENTE D. PADERNAL.